United States Patent [19]

Johnson et al.

[11] Patent Number: 4,462,745
[45] Date of Patent: Jul. 31, 1984

[54] PLATE FEED APPARATUS

[76] Inventors: Peter E. Johnson; James Young, both of P.O. Box 1692, Corvallis, Oreg. 97330

[21] Appl. No.: 359,201

[22] Filed: Mar. 18, 1982

[51] Int. Cl.³ .................. B65G 59/00; B65H 5/12
[52] U.S. Cl. .................... 414/330; 271/30 A; 271/94; 271/150; 414/786
[58] Field of Search ............... 414/330, 786; 271/12, 271/13, 30 A, 94, 96, 107, 150

[56] References Cited

U.S. PATENT DOCUMENTS

| | | | |
|---|---|---|---|
| 2,377,295 | 5/1945 | Cook | 271/12 |
| 2,804,974 | 9/1957 | Noon | 271/96 X |
| 2,847,213 | 8/1958 | Duncanson et al. | 271/150 |
| 3,148,876 | 9/1964 | Chandler et al. | 271/94 X |
| 3,212,772 | 10/1965 | Ward | 271/96 |
| 3,341,192 | 9/1967 | McMahon | 271/94 X |
| 4,177,982 | 12/1979 | Bewersdorf et al. | 271/30 A X |
| 4,349,126 | 9/1982 | Braun | 271/150 X |

Primary Examiner—Leslie J. Paperner
Assistant Examiner—Janice Krizek

Attorney, Agent, or Firm—Chernoff, Vilhauer, McClung, Birdwell & Stenzel

[57] ABSTRACT

A method and apparatus for serially removing the forwardmost plate from a stack of plates comprises rotating a cylindrical carrier having a chordal segment defined on its periphery with the stack of plates oriented so that the forwardmost plate is tangentially adjacent to the periphery of the carrier. A vacuum source draws air into an air inlet located on the chordal segment thereby creating a low pressure area. Accordingly as the chordal segment becomes parallel with the stack the low pressure causes the forwardmost plate to be drawn into contact with the chordal segment and thus block the air inlet. The plate continues to rotate with the carrier until it reaches a desired location where an air valve causes the vacuum to be temporarily discontinued thus allowing the plate to drop free of the carrier. An advance mechanism causes the stack to be advanced one plate thickness during each rotation of the carrier to position the next plate into contact with the carrier after each plate has been removed.

12 Claims, 4 Drawing Figures

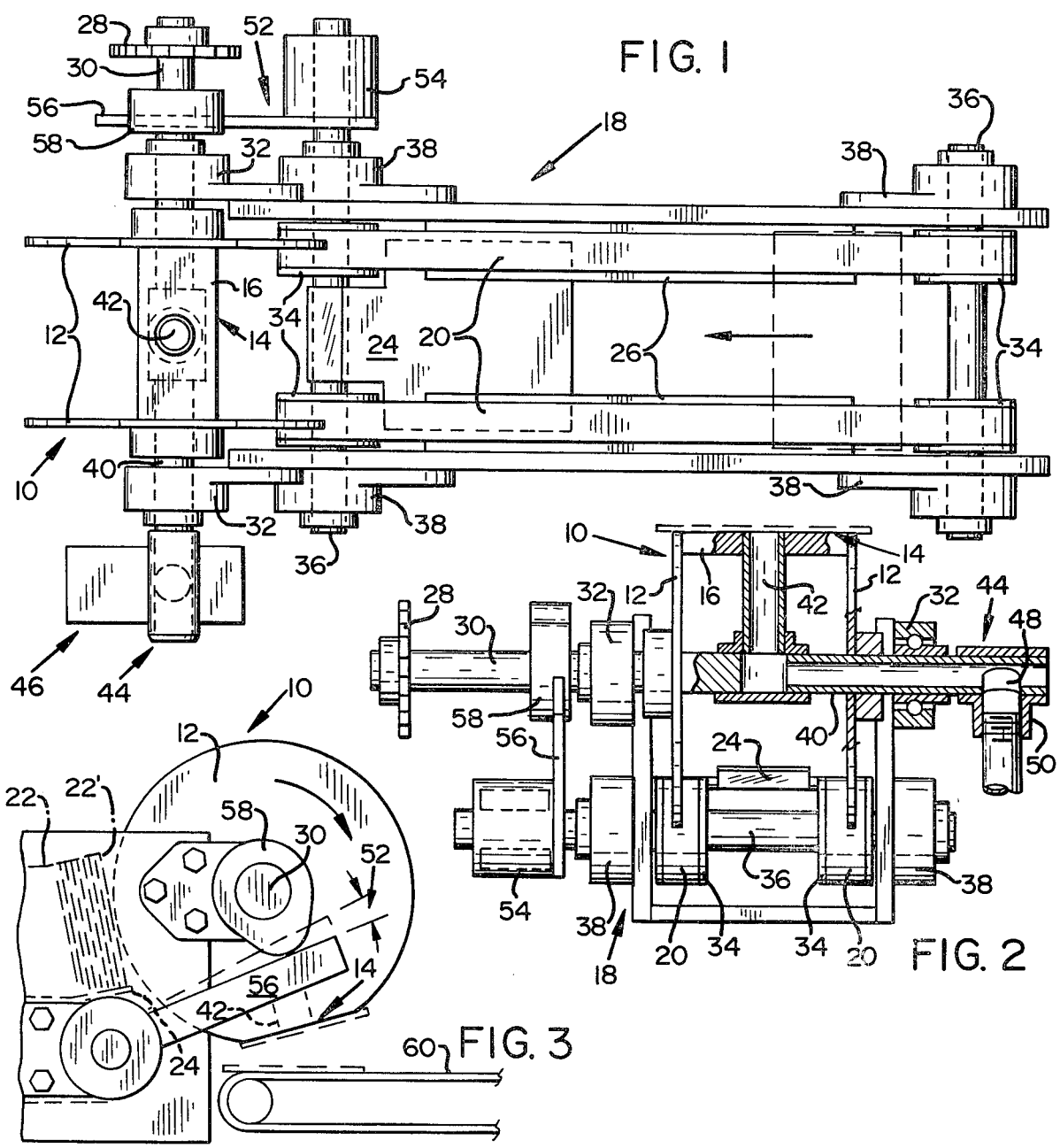

PLATE FEED APPARATUS

BACKGROUND AND SUMMARY OF THE INVENTION

This invention relates to a feed apparatus where the forwardmost plate is periodically removed from a stack of plates by a vacuum source, and in particular to such a device having a rotary carrier containing the vacuum inlet and serving as a stop so that the plate is pulled toward the vacuum inlet at the proper time rather than the vacuum inlet being moved into contact with the plate.

In many industrial operations it is necessary to serially remove plates from a stack of plates in order to use them in further applications. In this type of operation it is necessary that succeeding plates be delivered at accurately spaced time intervals and that only a single plate be delivered each time. While the difficulty of achieving these results varies according to the particular physical characteristics of the plates being fed, for most types of plates such repeatability is not available with the prior art feed apparatus. The present invention was developed for feeding the lead plates used in storage batteries and the embodiment illustrated addresses the problems encountered in feeding these plates. However, the principles taught are equally applicable to most other types of plates also.

Heretofore battery plates have been fed either by mechanical or vacuum feeders. The mechanical feeders generally array the stack of plates vertically and cause the bottom plate in the stack to periodically be pushed off of the stack through a gate which is provided to ensure that only one plate is fed at a time. Mechanical feeders of this type have a serious shortcoming particularly when they are used to feed battery plates which are made by filling an expanded metal grid with lead. Plates of this type generally are quite irregular and have the ends of the expanded metal framework extending from their edges. Accordingly, the plates tend to stick to one another and do not readily accommodate the sliding action of a mechanical feeder.

The vacuum feeders eliminate the sliding contact problem since they generally have arms, having vacuum pick-up elements at their ends, which are cyclically placed against the top surface of the plate so that the vacuum causes the plate to become affixed to the pick-up elements. The arms are then mechanically moved to a new position where the vacuum is interrupted and the plate deposited. Thus the top plate is lifted perpendicularly off of the stack. Not only are mechanisms of this type expensive to fabricate but their reciprocative lifting action limits the speed at which the plates can be fed. In addition, in the case of battery plates, which are quite porous, once the pick-up elements have made contact with the plate a portion of the vacuum flows through it and often causes the underlying plate to be picked off of the stack also. Furthermore, it is necessary to provide an indexing system to progressively position the topmost plate at the proper location for engagement by the mechanism. Such devices are expensive, unreliable and generally require that the apparatus be shut down in order to be reloaded.

The present invention overcomes the foregoing shortcomings and limitations of the prior art feeders by providing a cylindrical carrier which has a planar chordal segment located on a portion of its periphery. The carrier is rotated continuously about its central axis and a vacuum source draws air into an air inlet which is located on the chordal segment. A stack of plates, which is positioned on end, is then fed toward the carrier on a conveyor belt so that the forwardmost plate in the stack comes into contact with the periphery of the carrier and is generally tangential to it. While the stack of plates could be continuously urged toward the carrier with the periphery of the carrier acting as a stop to position the plate the desired distance from the chordal segment in the preferred embodiment of the present invention each time a plate is removed the stack is advanced a distance equal to the thickness of one plate by a one-way clutch located on the conveyor and actuated by a cam which rotates with the carrier. In this embodiment the periphery of the carrier still serves as a stop but the plate is not being continuously urged toward it.

As the carrier rotates to the point where the chordal segment is generally parallel with the forwardmost plate in the stack the flow of air into the inlet causes a low pressure area to be created in front of the forwardmost plate thereby pulling it against the chordal segment. Once the forwardmost plate has come into contact with the chordal segment, the air inlet is effectively closed off. Thus the low pressure area is terminated and does not affect the underlying plate. Since the forwardmost plate is pulled perpendicularly away from the next plate in the stack there is no sliding motion which may cause sticking. Also, since the plate does not come in contact with the vacuum inlet until it has been pulled free of the underlying plate, any air which is drawn through the forwardmost plate will have no affect on the underlying plate. The adhered plate then rotates with the carrier until the desired location for depositing the plate is reached whereupon the vacuum is temporarily terminated by means of an air valve in the vacuum line to facilitate removal of the plate.

Since the rotating carrier, in addition to acting as the plate transport mechanism, serves as the timing means for picking the forwardmost plate off of the stack, the vacuum flow can remain in effect continuously. Therefore, by placing multiple chordal segments around the periphery of the carrier it is possible to feed the plates at a much more rapid rate than would be possible with the prior art vacuum feeders.

Accordingly, it is a principal object of the present invention to provide a plate feed apparatus where the vacuum air inlet is not brought into contact with the forwardmost plate while the plate remains a part of the stack.

It is a further object of the present invention to provide such an apparatus where the air inlet is located on a rotary carrier.

It is a further object of the present invention to provide such an apparatus where the carrier serves as a stop to position the forwardmost plate a predetermined distance from the air inlet prior to its being brought into contact therewith.

It is a still further object of the present invention to provide such an apparatus where additional plates can be added to the stack without disrupting the operation of the apparatus.

It is a further object of the present invention to provide such an apparatus which can be programmed to deposit the plates at any desired location.

It is a further object of the present invention to provide such an apparatus where succeeding plates can be deposited in different locations.

It is a further object of the present invention to provide such an apparatus which is operated by a single motor.

It is a still further object of the present invention to provide a method by which plates can be fed utilizing the apparatus of the invention.

The foregoing objects, features and advantages of the present invention will be more readily understood upon consideration of the following detailed description of the invention, taken in conjunction with the accompanying drawings.

BRIEF DESCRIPTION OF THE DRAWINGS

FIG. 1 is a plan view of a plate feed apparatus embodying the features of the present invention.

FIG. 2 is an end elevation view of the apparatus of FIG. 1, partially broken away to show hidden detail.

FIG. 3 is a fragmentary side elevation view with the plate carrier being shown in a position for deposit of a plate being carried.

FIG. 4 is an opposite side elevation view, partially broken away to show hidden detail, with the plate carrier being shown in the position for picking up a plate.

DETAILED DESCRIPTION OF THE INVENTION

Referring to the drawings, the feeder of the present invention includes a cylindrical carrier 10, which in the embodiment illustrated is shown as a pair of spaced apart wheels 12. The carrier includes a planar chordal segment 14 located on a portion of its periphery which preferably is slightly shorter than or equal to the height of the plates being handled by the feeder. Since the chordal segment preferably extends across the entire width of the carrier, in the paired wheel embodiment illustrated it includes a carrier plate 16.

The carrier is rotatably mounted on a two-piece frame 18, which also carries feed means such as a pair of spaced-apart conveyor belts 20. The conveyor belts are arranged to support a stack of plates 22 that are oriented on end at a slight angle with respect to vertical. Each conveyor belt extends between an opposed pair of pulleys 34 which are attached at the end of conveyor shafts 36. The conveyor shafts in turn are journaled in flange bearings 38 which are attached to the frame pieces 18. The stack of plates is arranged so that the forwardmost plate 22', FIG. 3, abuts the periphery of the carrier and is generally tangential with it. However, as shown in FIG. 4, when the forwardmost plate 22' and chordal segment 14 are aligned, the centerline of the forwardmost plate is offset from the centerline of the chordal segment in the direction towards which the carrier rotates, in order that the bottom edge of the forwardmost plate does not strike the remaining plates in the stack as it is rotated away from the stack by the carrier. This alignment is aided by a ramp 24 which supports the plates at the front of the stack at the appropriate angle and lifts them off of the conveyor belts 20. Support brackets 26 support the belts and prevent undue deflection due to the weight of the plates. The carrier 10 is rotated about its central axis on an axle 30 by means such as a motor (not shown) which drives a sprocket 28 that is attached to the axle. The axle is journaled at each of its ends by flange bearings 32 which are attached to the frame pieces 18.

As will be explained later, in the embodiment illustrated one plate is removed from the stack upon each rotation of the carrier 10. Thus advance means 52 are provided to advance the stack to where the next plate 22" abuts the periphery of the carrier each time that the forwardmost plate 22' is removed. In the embodiment illustrated this is accomplished by means of a one-way clutch 54 which is attached to the conveyor shaft 36 located nearest to the carrier. The clutch is actuated to rotate the conveyor shaft, and thus the conveyor belts 20, in a direction to advance the stack of plates toward the carrier when a lever 56, associated with the clutch, is depressed. A cam 58, which is attached to the end of the axle 30, adjacent to the sprocket 28, engages the lever 56 and causes it to be depressed during each rotation of the carrier. The cam and lever are arranged so that the stack advances a distance approximately equal to the thickness of one of the plates when the chordal segment is not located in front of the stack.

While the advance means advances the stack, the position of the forwardmost plate relative to the chordal segment is accomplished by the plate coming into contact with the periphery of the carrier. Thus the carrier acts as a stop to index the forwardmost plate of the chordal segment which must be dimensioned to provide the proper distance.

Alternately the conveyor belts could be arranged to continuously urge the stack toward the carrier, either by means of a slip clutch conveyor drive or by allowing the stack to slip on continuously moving conveyor belts. In any case, it is possible to add additional plates to the end of the stack at any time without the necessity of disrupting operation of the apparatus.

The end of the axle 30 which extends away from the sprocket 28 is in the form of a closed ended hollow tube 40. The hollow tube is joined at the center of the carrier at right angles with an air inlet 42 which opens out of the chordal segment 14 proximate the center of the carrier plate 16. An air valve 44 connects the extremity of the hollow tube 40 with a vacuum source 46, such as a pump. Thus when the vacuum source is operating, air from in front of the chordal segment is drawn into the air inlet 42. In the embodiment illustrated the air valve 44 comprises a hollow T which slides over the hollow tube 40. The hollow tube has an elongated opening 48 extending through its side wall which is aligned with the upright leg 50 of the T. However, the opening 48 does not extend around the entire radial extent of the hollow tube. Thus during one portion of the rotation of the carrier, the upright leg 50 of the air valve is blocked by the hollow tube, which discontinues the operation of the vacuum for a short period thereby allowing the plate to be released and deposited in a suitable location. In the embodiment illustrated the opening 48 is oriented so that the plate is released when the chordal segment 14 is at its bottom-most rotational position thereby allowing the plate to be dropped onto another mechanism, such as a conveyor belt 60 for further use. However, the opening could be arranged to release the plate at any desired rotational position.

In operation, a stack of plates 22 is placed on the conveyor belt 20 with the forwardmost plate 22' in contact with the carrier 12, FIG. 3. The motor (not shown) and vacuum source 46 are then activated causing the carrier to rotate on its axle 30 and air to be drawn into the air inlet 42. The air being drawn into the air inlet creates a low pressure area in front of the chordal segment and as the chordal segment moves to a position where it is generally parallel with the forwardmost plate 22' this low pressure area causes the forwardmost plate to be drawn away from the rest of the stack and into contact with the chordal segment where it is held in place by the vacuum. It will be noted that this low pressure does not reach the second plate 22' when the chordal segment first comes into alignment since at that time this plate is covered by the forwardmost plate 22'. Then when the forwardmost plate is pulled away from the stack it immediately comes into contact with the chordal segment and covers the air inlet 42 thus terminating the air flow through the air inlet. As a result the second plate still is not subject to this reduced pressure. Accordingly, the second plate 22" will remain in place on the stack.

While a small amount of air will be drawn through the plate when it is in position on the chordal segment, since it is separated from the next plate this small amount of air will not be enough to pull the next plate across the resulting gap. In this regard the present invention is different from prior art vacuum feeders where the vacuum source becomes attached to the forwardmost plate while the forwardmost plate is still in contact with the second plate.

The carrier continues to rotate thus moving the attached plate away from the stack. The plate stays attached to the carrier until such time as the vacuum flow in the air inlet is discontinued due to the elongate opening 48 in the hollow axial tube 40 no longer being aligned with the upright leg 50 of the air valve 44. At this point the plate is released and will drop onto the conveyor 60.

At a particular point during the rotation of the carrier, other than when the chordal segment is aligned with the stack, the cam 58 engages the lever 56 and causes it to be depressed thereby activating the one-way clutch 54 which moves the conveyor a sufficient distance to advance the stack a distance equal to the thickness of one plate. Thus the next plate 22" is moved into contact with the carrier.

If there are more than one chordal segment, the cam 58 would have a like number of lobes and the opening 48 in the hollow tube would have a like number of block segments. Also with multiple chordal segments the plates carried by each of them could be released at different angular positions, if desired, by arranging the block segments appropriately.

The terms and expressions which have been employed in the foregoing abstract and specification are used therein as terms of description and not of limitation, and there is no intention, in the use of such terms and expressions, of excluding equivalents of the features shown and described, or portions thereof, it being recognized that the scope of the invention is defined and limited only by the claims which follow.

What is claimed is:

1. A feed apparatus for sequentially removing a single a plate or the like from a stack of such plates, said apparatus comprising:
   (a) a cylindrical carrier having a central axis;
   (b) said carrier defining a chordal segment on a portion of its periphery;
   (c) said chordal segment having air inlet means opening therein;
   (d) feed means for moving said stack of plates towards said carrier after each successive plate is removed from the stack;
   (e) stop means for indexing said stack of plates so that the forwardmost plate is oriented generally tangential to said carrier and is located proximate the outer periphery thereof;
   (f) means for rotating said carrier about its central axis;
   (g) vacuum means for drawing a sufficient volume of air into said air inlet means to pull said forwardmost plate away from said stack and into contact with said chordal segment when said chordal segment is aligned with said plate;
   (h) said chordal segment being sufficiently large relative to the diameter of said carrier that when said forwardmost plate is pulled into contact with said chordal segment soley by said vacuum means, said forwardmost plate is pulled completely free from contact with the remaining plates in said stack; and
   (i) said carrier being positioned relative to said stack of plates such that when said chordal segment is aligned with said forwardmost plate the centerline of said forwardmost plate is offset from the centerline of said chordal segment in the direction of rotation of said carrier.

2. The apparatus of claim 1 wherein said cylindrical carrier comprises paired spaced-apart wheels and said chordal segment includes a carrier plate which extends between said wheels.

3. The apparatus of either claim 1 or claim 2 wherein said stop means comprises the outer periphery of said carrier.

4. The apparatus of either claim 1 or 2 wherein said feed means includes means for advancing said stack of plates approximately one plate thickness during each rotation of said carrier so as to position each succeeding plate adjacent to said carrier after the forwardmost plate has been removed.

5. The apparatus of claim 4 wherein said feed means comprises;
   (a) conveyor belts for carrying said stack of plates;
   (b) a one way clutch operably associated with said conveyor belts;
   (c) actuation means interconnected with said one way clutch for moving said conveyor belt a predetermined distance upon actuation of said actuation means; and
   (d) cam means associated with said carrier for actuating said actuation means during a predetermined angular portion of said carrier's rotational travel.

6. The apparatus of either claim 1 or 2 including interruption means for substantially discontinuing the operation of said vacuum means during a predetermined angular portion of said carrier's rotational travel to cause said plate to be released from said chordal segment.

7. The apparatus of claim 6 wherein said vacuum means includes a hollow tube which is co-axial with the central axis of the carrier and rotates there with, and is fluidly interconnected with said air inlet means, and said interruption means comprises:
   (a) an air valve which slideably fits over the extremity of said hollow tube, said air valve including an upright leg which extends perpendicularly from said hollow tube;
   (b) said hollow tube defining an opening through the side wall thereof which is aligned with said upright leg;
   (c) said opening extended over less than the entire radial extent of said hollow tube such that during a portion of the rotation of said carrier, said upright leg is blocked by said hollow tube.

8. The apparatus of claim 7 wherein said opening is oriented in a manner such that said opening is blocked when said chordal segment is positioned approximately where said plates are to be deposited.

9. A method for sequentially removing a single plate or the like from a stack of plates, comprising:
   (a) feeding the stack of plates towards a cylindrical carrier with the forwardmost plate in said stack being positioned generally tangential to the periphery of said carrier;
   (b) drawing air into an air inlet which is located on a chordal segment which defines a portion of the periphery of said carrier;
   (c) stopping said stack of plates such that said forwardmost plate is separated from said chordal segment by a predetermined distance;
   (d) said carrier having been positioned relative to said stack of plates such that when said chordal segment is generally parallel with said forwardmost plate the centerline of said forwardmost plate is offset from the centerline of said chordal segment in the direction of rotation of said carrier;
   (e) rotating said carrier so that said chordal segment becomes generally parallel with said forwardmost plate so that the flow of air into said inlet causes said forwardmost plate to be pulled completely away from contact with the remaining plates in said stack and into contact with said chordal segment;
   (f) continuing to rotate said carrier with said forwardmost plate attached;
   (g) removing said forwardmost plate from said carrier at a location remote from said stack;
   (h) cyclically repeating steps a-g.

10. The method of claim 9 wherein said stack of plates is stopped by said forwardmost plate coming into contact with the periphery of said carrier.

11. The method of claim 9 wherein said forwardmost plate is removed from said carrier by discontinuing the drawing of air into the air inlet.

12. The method of claim 11 wherein said stack of plates is fed and stopped by moving said stack forward a distance equal to approximately one plate thickness upon each rotation of said carrier.

* * * * *